US012749429B2

(12) United States Patent
Goetz et al.

(10) Patent No.: US 12,749,429 B2
(45) Date of Patent: Sep. 29, 2026

(54) SYSTEMS, METHODS AND DEVICES FOR PROVIDING SEQUENCE BASED DISPLAY DRIVERS

(71) Applicant: Snap Inc., Santa Monica, CA (US)

(72) Inventors: Howard V. Goetz, Tigard, OR (US); Glen R. Sands, Hillsboro, OR (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 19/050,560

(22) Filed: Feb. 11, 2025

(65) Prior Publication Data

US 2025/0182674 A1 Jun. 5, 2025

Related U.S. Application Data

(63) Continuation of application No. 18/393,052, filed on Dec. 21, 2023, now Pat. No. 12,525,168, which is a continuation of application No. 17/998,124, filed as application No. PCT/US2021/032477 on May 14, 2021, now Pat. No. 11,908,381.

(60) Provisional application No. 63/024,637, filed on May 14, 2020.

(51) Int. Cl.
*G09G 3/20* (2006.01)

(52) U.S. Cl.
CPC ..... *G09G 3/2096* (2013.01); *G09G 2360/121* (2013.01)

(58) Field of Classification Search
CPC ........... G09G 3/2096; G09G 2360/121; G09G 3/2077; G09G 2320/08; G09G 2360/02; G09G 2360/12; G09G 2360/18; G09G 2370/045; G09G 2370/10; G09G 2370/12; G09G 5/18; G09G 5/363; G09G 5/399; G09G 5/006
See application file for complete search history.

(56) References Cited

U.S. PATENT DOCUMENTS

| | | | | |
|---|---|---|---|---|
| 2008/0043002 | A1* | 2/2008 | Kaehler | G09G 5/006 345/204 |
| 2010/0053182 | A1* | 3/2010 | Jeon | G09G 5/399 345/557 |
| 2018/0081429 | A1 | 3/2018 | Akenine-Moller et al. | |
| 2021/0210046 | A1* | 7/2021 | Iverson | G06F 3/013 |

(Continued)

FOREIGN PATENT DOCUMENTS

| | | | |
|---|---|---|---|
| CN | 115516546 | A | 12/2022 |
| TW | 202143698 | A | 11/2021 |
| WO | WO-2021231882 | A1 | 11/2021 |

OTHER PUBLICATIONS

"U.S. Appl. No. 18/393,052, Examiner Interview Summary mailed Jun. 18, 2025", 2 pgs.

(Continued)

*Primary Examiner* — Towfiq Elahi
(74) *Attorney, Agent, or Firm* — Schwegman Lundberg & Woessner, P.A.

(57) ABSTRACT

A display driver device (210) receives a downloadable "sequence" for dynamically reconfiguring displayed image characteristics in an image system. The display driver device comprises one or more storage devices, for example,
(Continued)

memory devices, for storing image data (218) and portions of drive sequences (219) that are downloadable and/or updated in real time depending on various inputs (214).

20 Claims, 8 Drawing Sheets

(56) References Cited

U.S. PATENT DOCUMENTS

| | | | |
|---|---|---|---|
| 2023/0178000 | A1 | 6/2023 | Goetz et al. |
| 2024/0127735 | A1 | 4/2024 | Goetz et al. |

OTHER PUBLICATIONS

"U.S. Appl. No. 18/393,052, Non Final Office Action mailed Apr. 10, 2025", 16 pgs.
"U.S. Appl. No. 18/393,052, Notice of Allowance mailed Feb. 24, 2025", 7 pgs.
"U.S. Appl. No. 18/393,052, Response filed Jun. 30, 2025 to Non Final Office Action mailed Apr. 10, 2025", 9 pgs.
"U.S. Appl. No. 18/393,052, Examiner Interview Summary mailed Aug. 12, 2024", 2 pgs.
"U.S. Appl. No. 18/393,052, Non Final Office Action mailed Jul. 9, 2024", 16 pgs.
"U.S. Appl. No. 18/393,052, Notice of Allowance mailed Nov. 19, 2024", 7 pgs.
"U.S. Appl. No. 18/393,052, Response filed Aug. 8, 2024 to Non Final Office Action mailed Jul. 9, 2024", 9 pgs.
"Chinese Application Serial No. 202180034110.8, Response filed Jan. 27, 2025 to Office Action mailed Nov. 28, 2024", W/English Claims, 9 pgs.
"European Application Serial No. 21730414.6, Response filed Feb. 4, 2026 to Communication Pursuant to Article 94(3) EPC mailed Oct. 7, 2025", w/ English Claims, 14 pgs.
"U.S. Appl. No. 18/393,052, Notice of Allowance mailed Sep. 29, 2025", 7 pgs.
"European Application Serial No. 21730414.6, Communication Pursuant to Article 94(3) EPC mailed Oct. 7, 2025", 8 pgs.
U.S. Appl. No. 17/998,124 now U.S. Pat. No. 11,908,381, filed Nov. 7, 2022, Systems, Methods and Devices for Providing Sequence Based Display Drivers.
U.S. Appl. No. 18/393,052, filed Dec. 21, 2023, Systems, Methods and Devices for Providing Sequence Based Display Drivers.

* cited by examiner

| Pixel # | Gray-Val | C[0] | C[1] | C[2] |
|---|---|---|---|---|
| 0 | 0 | 0 | 0 | 0 |
| 1 | 1 | 1 | 0 | 0 |
| 2 | 2 | 0 | 1 | 0 |
| 3 | 3 | 1 | 1 | 0 |
| 4 | 4 | 0 | 0 | 1 |
| 5 | 5 | 1 | 0 | 1 |
| 6 | 6 | 0 | 1 | 1 |
| 7 | 7 | 1 | 1 | 1 |

SYSTEMS, METHODS AND DEVICES FOR PROVIDING SEQUENCE BASED DISPLAY DRIVERS

CROSS-REFERENCE TO RELATED APPLICATION

The present application is a continuation of U.S. patent application Ser. No. 18/393,052, which application is a continuation of U.S. patent application Ser. No. 17/998,124, filed Nov. 7, 2022, now issued as U.S. Pat. No. 11,908,381, which application is a U.S. National Stage Filing under 35 U.S.C. 371 from International Application No. PCT/US2021/032477, filed on 14 May 2021, and published as WO 2021/231882 on 18 Nov. 2021, which application claims priority to U.S. Provisional Patent Application No. 63/024,637, filed May 14, 2020, and entitled "SYSTEMS, METHODS AND DEVICES FOR PROVIDING SEQUENCE BASED DISPLAY DRIVERS", the entire disclosure of which is incorporated herein by reference.

FIELD OF THE DISCLOSURE

The present disclosure relates to spatial light modulators, displays and/or microdisplays. More particularly, the disclosure relates to systems and methods of providing digital display driver circuitry and software modules for digital spatial light modulators, displays and/or microdisplays, including, but not limited to digital displays, digital Liquid Crystal (LC) displays, digital Liquid Crystal on Silicon (LCoS) displays, organic Light-Emitting Diode displays (OLED), and micro versions (i.e., microdisplay versions) of the aforementioned types of displays.

BACKGROUND OF THE DISCLOSURE

LCOS displays and microdisplays are used in a number of different applications. These can range from high-brightness projection systems, to augmented reality (AR) or virtual reality (VR) headsets, to phase-mode scientific applications. These different applications can place widely varying and sometimes unanticipated requirements on their Display Driver Integrated Circuit (DDIC) capabilities such as signal frequencies, timing, detailed sequencing, and display or application specific data formatting.

Conventional LCOS displays and their associated DDIC chips typically have hard-coded drive algorithms. In general, known DDIC chips perform the same sequence of operations when driving an attached display, and as a result, there is very little flexibility when the desired application varies from what the manufacturer originally intended. In particular, there is generally no ability to change features such as the gray-scale algorithm being used, the frame-rate, the bit-depth, the color order (in color-sequential applications), the timing of the illumination, or other aspects of operation. These display characteristics can be used to control brightness, resolution, depth perception, and other visual effects of a displayed image.

When image data is rendered in a prior-art display device, the display device typically has very few options for modifying the characteristics of the displayed image. These display devices generally just take the incoming video data and write it to the pixel array in the display. Such display devices typically have a fixed data format that they require from the display driver. This data format may not be in an industry-standard video data format, so the display driver is required to reformat the video data to match the requirements of the display, using dedicate hardware (logic). For many prior-art displays, there are custom-designed display drivers which are designed to do this reformatting. When new or improved display designs are created, usually it is a requirement to redesign the display drivers as well.

When some existing image rendering technologies are employed to reconfigure display characteristics (e.g., frame rate, brightness of the display, etc.), these existing image rendering technologies involve turning off the display or otherwise interrupting the rendering of content for display to reconfigure or update the display characteristics. Sometimes, these changes may consume an amount of time that is on the order of seconds and often require image rendering to be temporarily terminated. As result, existing techniques for reconfiguring display characteristics in an image system may not enable real-time and/or dynamic reconfiguration of display characteristics, e.g., while image data is being rendered.

BRIEF DESCRIPTION OF THE DRAWINGS

The present disclosure is illustrated and described herein with reference to the various drawings, in which like reference numbers are used to denote like system components, as appropriate, and in which.

DETAILED DESCRIPTION OF THE DISCLOSURE

Figure 1:
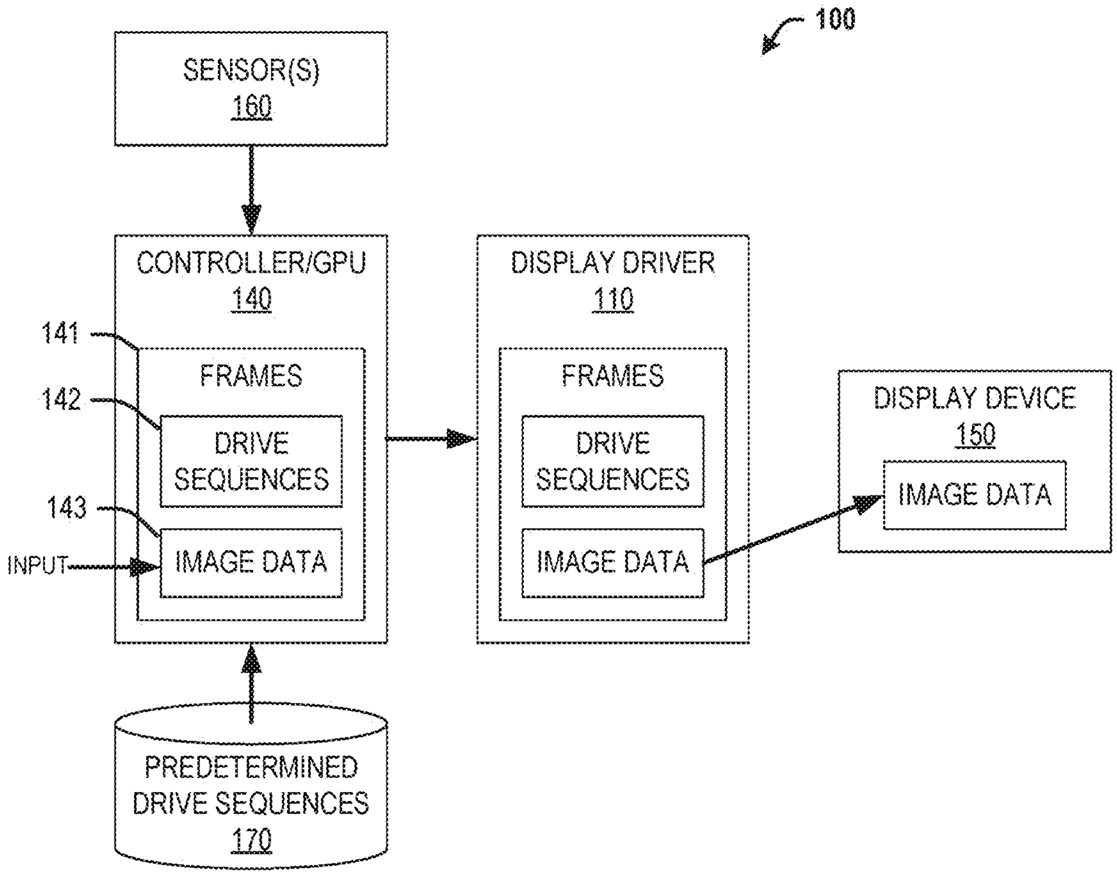
FIG. 1 is a block diagram of an overview of a display system, according to an example embodiment.

Disclosed herein are embodiments of a display driver device, including circuitry, hardware and/or software, in an image system that makes use of a downloadable "sequence" for dynamically reconfiguring displayed image characteristics in an image system. The display driver device can be configured with one or more storage devices, for example, memory devices, for storing image data, for example, static or still images or dynamic/moving images (e.g., video data). The display driver device also contains dedicated storage devices that are used to store the "sequence". The sequence defines in detail the sequential series of actions that take place in the display driver starting at each Vsync. These Vsync actions control the moving of image data from the input of the display driver, into and out of the various cache memories, and to display driver output. The sequence includes instructions that can modify the image data in a flexible manner, and may also include instructions that can send Serial Peripheral Interface (SPI) sequences out of the display driver circuit to control other external devices (such as light sources). There are additional actions that can be included in in the sequence which support display operation, as further described below.

As display designs have continued to evolve, user expectations as to the quality of the displayed image have risen considerably. The display characteristics may determine how the image data is perceived by a user, but often there are adjustments to the image data that can enhance or otherwise modify this user experience. The display driver device has characteristics that may be manipulated to enhance or otherwise alter the way in which a user experiences image data rendered on a display. The display driver device of the present disclosure enables dynamic (e.g., real-time and uninterrupted) reconfiguring of the display characteristics for image data that is rendered in a display device of an image system in order to, for example, affect these enhancements. Hereinafter, the terms "driver," "display driver device," and "display driver" may be used interchangeably.

To illustrate, consider the advantages of dynamic reconfiguration of display characteristics in a display driver implemented in an augmented reality (AR) headset. When a user wears an AR headset, the headset typically overlays graphics, text, instructions, controls or other information (i.e., overlay data) over an image or video of a real-time environment of the user. The real-time environment data may be captured by imaging (e.g., via a still, video, panoramic, or other camera), and when a user moves their head left, right, up, or down, the image overlay data is also updated, such that the overlay data also, accordingly, pans left, right, up, or down in the user's environment. When a user moves their head left, right, up, or down, the real-time environment data may also be updated. Using the ability to dynamically reconfigure display characteristics (e.g., display characteristics of still or video images), an AR headset may dim areas (e.g., change the brightness or grayscale levels of groups of pixels) of the headset display that a user's eyes are not focused on and may increase the brightness of areas of the headset display that a user's eyes are focused on.

Similarly, with a display driver in accordance with the disclosed embodiments, the AR headset may reduce the resolution and/or frame-rate of image data in areas of the headset display that a user's eyes are not focused on and may increase the resolution and/or frame-rate of image data in areas of the headset display that a user's eyes are focused on. Because the reconfiguration of display driver characteristics is performed dynamically and without interruption of the displaying of image content to the user, the reconfiguration of the display characteristics may appear seamless to the user and may be used to enhance the user's overall quality of visual experience. Furthermore, as a tangential benefit, adjusting the brightness, grayscale level, resolution, and/or frame-rate of focal points or locations of the headset display (corresponding to pixels of the headset display), in accordance with a user's preferences (e.g., predetermined or based on data regarding the user's actual, known, or expected environment) may result in, for example, reduced power consumption by the headset display and/or improved visibility to portions of an image focused on by a user of the headset display. These example features are described in detail hereafter in the context of embodiments of dynamically reconfiguring display driver characteristics, by updating one or more memories of a display driver with image data and drive sequences for processing the image data and configuring the display device. This reconfigurability of the display driver also gives it the ability to modify the display data as necessary to correct for undesirable effects of display temperature changes, ambient light changes, or other external factors. As another tangential benefit of this reconfigurability is the potential to use a common display driver design for more than one display device, and/or for succeeding generations of display devices.

In particular, a display driver or device (including, for example, display driver circuitry and/or display driver software) is configured with the ability to receive (or "download") a "drive sequence", which can be incorporated into a block of instructions, a downloadable file, or special purpose software code. The display driver can include a display driver integrated circuit (DDIC). Alternately, the display driver may be incorporated in or integrated into, for example, an application specific integrated circuit (ASIC) or similar circuitry. According to embodiments disclosed herein, one or more drive sequences are loaded into a display driver from an external controller device, such as a graphics processing unit (GPU), an internal or external memory, or other processor of a host system. In an example embodiment, one or more drive sequences are loaded into display driver circuitry. In an example embodiment, the display driver circuitry includes a DDIC or is a DDIC. In an example embodiment, one or more drive sequences are loaded into display driver circuitry via, for example, a DDIC. In an example embodiment, one or more drive sequences are loaded into a DDIC directly.

As further described herein, the "drive sequence" represents a list of one or more operations or encoded instructions, in accordance with the present disclosure, by which the detailed operation of the display driver is determined or changed. By defining this detailed operation of the display driver, it is possible to (directly or indirectly) manipulate display modes of operation, power levels, timing characteristics, and details of the image rendering that are applied to a display device to cause the display device to display image data in a particular manner. The drive sequence will hereinafter be referred to as a "sequence," "master sequence," and/or "sequence table." In an example embodiment, one or more drive sequences are loaded into the display driver after the display driver has been powered-on. In an example embodiment, the one or more drive sequences are pre-loaded into one or more memories of the display driver. Once loaded, a drive sequence may be executed starting at each new frame of data, or sub frame, or vertical sync (Vsync) event from a data source, e.g. a GPU, digital camera, video recording, or other source of images or video images. Further, the drive sequence can include "op-codes" and various data arguments that determine what data (e.g., video image data, commands, register writes and/or other data) is sent to a display device of a display system, when the data is sent, and what manipulations or other filters are applied to the data (e.g., to provide a desired modulation of the LCoS). The drive sequence further enables driving of external control outputs from the display driver, such as Laser/LED enables, and allows arbitrary Serial Peripheral Interface (SPI) commands (embedded in the instructions of the drive sequence) to be transmitted to a backplane and other system chips (e.g., analog support chips, laser driver devices) at different points in time as desired by an operator. Since the drive sequence can orchestrate execution of the commands and instructions in the drive sequence, which may be in the form of a table of instructions or list of instructions, and since each instruction or event in the sequence includes an execution time (e.g., relative to Vsync) the events all occur in controlled timing. This timing may be defined by a user or system designer. Further, the timing is enabled by one or more time-base circuits incorporated into the display driver, which enables synchronizing execution of one or more drive sequences (and instructions therein) with one or more internal times (e.g. "ticks"), as well as with video synchronization (VSync) events, e.g. frame intervals. For the purposes of this disclosure, VSync is a standard video interface that comprises 27 wires, including 8-bits of red data (denoted R[7:0]), 8-bits of green data (denoted G[7:0]), 8-bits of blue data (denoted B[7:0]), a video clock associated with this data (typically denoted "CLK"), a vertical synchronization pulse that happens at the beginning of each frame (denoted "Vsync" or "VS"), and a horizontal synchronization pulse that happens at the beginning of each row of data (denoted "Hsync" or just "HS"). Further, a "Vsync event" can include a detection of a pulse on the Vsync wire. Alternatively, the Vsync pulse can be encoded into a data packet, or transmitted via other means. In general, however, a Vsync event or pulse can be included in most different types of video interfaces, and can take different forms so long as it performs the function of indicating to an interface that a new data frame is starting. For example, in a 60 HZ video, Vsync pulses are transmitted 60 times per second.

Example embodiments are described herein in the context of driving spatial electromagnetic radiation (e.g., light) modulators, including but not limited to displays and microdisplays, and providing sequence-based circuitry and/or software modules for driver systems or devices that may be, for example, within display systems (e.g., digital display systems). While LCOS displays are used for exemplary purposes herein, one of ordinary skill in the art will appreciate that the disclosed embodiments include and may be applied to other digital display system types including, but not limited to digital Liquid Crystal (LC) displays, organic Light-Emitting Diode displays (OLED), microLED displays, etc.

In the following detailed description, reference is made to the accompanying drawings which form a part hereof and in which are shown, by way of illustration, embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives (e.g. "communicatively coupled"), may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B," "A or B," or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A) B" means (B) or (AB) that is, A is an optional element.

The descriptions may use the terms "embodiment" or "embodiments," which may each refer to one or more of the same or different embodiments. Furthermore, the terms "comprising," "comprises," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Various embodiments are now described with reference to the drawings, wherein like reference numerals are used to refer to like elements throughout. In the following description, for purposes of explanation, numerous specific details are set forth in order to promote a thorough understanding of one or more embodiments. It may be evident in some or all instances, however, that any embodiment described below can be practiced without adopting specific design details described below.

FIG. 1 illustrates a simplified view of an image system 100 that is configured to dynamically configure and/or reconfigure display characteristics, consistent with embodiments of the present disclosure. To support dynamic reconfiguration of display characteristics, the image system 100 can include a controller 140, a display driver 110, and a display device 150. The controller 140 can include a graphics processing unit (GPU), and can be configured to combine image data 143 with one or more drive sequences 142 into image data frames 141 and/or subframes. Herein, "subframes" refer to situations in which more than one version of an image is sent to the display during one image frame. For example: in "color-sequential" systems it is common to send all the red color information in an image to a display packed together as a separate subframe. This is then typically followed by a green subframe and then a blue subframe. These subframes happen in such a short period of time that the eye blends the colors together and perceives the image as a full-color image. It would be understood by one of ordinary skill in the art that the colors may vary. It would also be understood by one of ordinary skill in the art that all of the colors do not have to vary from each other (i.e., one color may be the same as another one or more of the colors). As discussed herein, the one or more drive sequences 142 can include settings that reconfigure, update, institute, initiate, adjust, change, and/or modify the data being transmitted to the display device 150 and/or image data 113 displayed thereon. The image data 143 is merged or combined with the one or more drive sequences 142 into the image data frames 141, so the settings included in the one or more drive sequences 142 may be transmitted to the display driver 110 without interrupting the transmission of the image data 143. Alternately, the drive sequences 142 may be transmitted to the display driver 110 over a separate interface, for example, a Serial Peripheral Interface (SPI). It would be understood by one of ordinary skill in the art that other interfaces may be utilized. The image data frames 141 may be formatted in accordance with, for example, one or more MIPI ("mobile industry processor interface") or modified-MIP interfaces or communication protocols. The controller 140 may be configured to transmit the image data frames 141 to the display driver 110 over a communications channel (e.g., a conductive bus, a network, a wireless interface, etc.). The controller 140 may include additional features and may be configured to define or select the one or more drive sequences 142 at least partially based on information received from one or more sensors 160.

For example, the displayed image might benefit from changes in the drive sequence based on the temperature of the display. As is well-known, liquid crystal displays in particular are extremely sensitive to temperature and might require adjustments to display voltage or timing to compensate for the actual device temperature and maintain image quality. In this case the controller 140 might be programmed to periodically command a temperature measurement of the display 150, read the result via the sensors input 160 and use an internal software "look-up table" or equivalent (e.g. another method of cross-referencing) to determine the best sequence 142 to use from a list (stored in a local memory) for that temperature. This new sequence would then be transmitted to the display as described above. In another example, the controller 140 may be configured to brighten or dim the display in response to the ambient illumination-in this case via a light sensor attached to the controller 140. As before, the ambient illumination could be used to select one of the available stored drive sequences 170 which would be transmitted to the display driver 110.

The display driver 110 can be configured to operate the display 150 using the image data frames 141 received from the controller 140. The display driver 110 may use information (e.g., the one or more drive sequences 142 contained within the image data frames 141) to operate the display 150. The controller or GPU 140 reads the drive sequences from memory or external storage as needed to update the stored drive sequences 142. The display driver 110 may separate or parse the image data 143 and the one or more drive sequences 142 from the image data frames 141. The display driver 110 may temporarily store the image data 143 and the one or more drive sequences 142 in one or more storage devices of display driver 110, as further described herein, for example with reference to FIG. 2. The display driver 110 may use the display characteristics contained within the one or more drive sequences 142 to configure the formatting of display data for the display 150, and the display driver 110 may provide the image data 143 to the display 150 to be displayed with the display drive characteristics from the one or more drive sequences 142. The drive sequence in use at any given time will specify when and how the image data, and if necessary, a new sequence is sent to the display. The new sequence data is typically sent to the display in between blocks of image data or in some embodiments is appended on to the front of the data transmission block (e.g., for transmission of image data, video data, and/or sequences or sequence data transmission block). In systems using the MIPI interface or other packet-based video interfaces to input video data, special packets may defined and used for non-image data-such as the sequence data. By receiving, parsing, and applying the one or more drive sequences 142 for the display 150, the display driver 110 supports dynamic reconfiguration of display characteristics with the display 150. The display driver 110 may include additional features to facilitate dynamic reconfiguration of display characteristics with the display 150, as further described herein. These additional features may include alternate interfaces for configuration and sequence data, such as SPI. They may also include "double-buffered" or "alternate" versions of internal configuration memories in the display controller, such that one configuration memory may be updated while the alternate version is being used. Internal multiplexing would then be used to swap or replace the newly-updated version for the current in-use version at the next Vsync (frame-sync) event.

The display driver 110 enables individualized implementations of one or more drive sequences 142 selection and/or definition. Because the display driver 110 may be configured to receive and interpret the display drive characteristics or displayed/display image parameters (e.g., resolution, power levels, etc.) defined by one or more drive sequences 142, developers may create unique applications that define the one or more drive sequences 142. In other words, the controller 140 may be implemented as a process, software application, and/or circuitry that is independent of the display driver 110, allowing one or more developers to update the one or more drive sequences 142 in accordance with their preferences. This characteristic of the display driver 110 and the one or more drive sequences 142 enables varied and customized applications of the dynamic reconfiguration of displayed/display image characteristics that is supported by the image system 100.

Operation of controller 140 and/or display driver device 110 may be controlled by one or more processors, not shown herein but understood as being incorporated by those having ordinary skill in the art in light of this disclosure. In an example embodiment, the one or more processors may include a GPU ("graphics processing unit"), an SoC ("system on a chip"), a CPU ("central processing unit"), a DSP ("digital signal processor"), an ASIC ("application specific integrated circuit"), or the like. Further, additional components of system 100 not illustrated herein may be contemplated by those of ordinary skill in the art in light of this disclosure. For example, Controller 140 can include a sensor data acquisition module to obtain, receive and/or store sensor data acquired from a variety of sensors 160. In an example embodiment, drive sequences 142 can be updated, switched, or revised in real-time responsive to the sensor data, including data from an inertial measurement sensor, an ambient light sensor, a temperature sensor, an image sensor, and/or an eye tracking sensor, as specific illustrative and non-exhaustive examples of sensors. Other sensors may also be used. In general, a method for updating drive sequences based on sensor data can include: 1) Acquire the sensor readings, 2) Use the sensor readings to determine which of a number of pre-stored sequences 170 is a best fit for the sensor readings, 3) Load the selected sequence into the current sequence 142, 4) Determine which upcoming frame or sub-frame the new sequence will begin being used at, 5) transmit the sequence information to the controller 140. In step 2 above, the "determine which sequence to use" step can use a look-up list. Note that any GPU or other processor (140) will always include many other modules not shown in the figure and as noted previously can be assumed to include general-purpose computation capabilities, programming and a program store, additional memory available to the processor or GPU, and usually other hardware as well.

Further, controller 140 can include an image data module (not shown) or generating instructions to acquire and format image data 143. For example, the image data module may acquire and/or receive image data, for example, raw image data and apply format instructions to generate formatted image data 143, according to an embodiment. The image data module (not shown) may cause the image system 100 to acquire the image data from one or more image sensors that generate at least part of the sensor data. The image data 143 may further be acquired from one or more other sources, such as but not limited to, digital camera, downloads over the Internet, received from a wireless connection (e.g., Wi-Fi, LTE, etc.), received from a storage device (e.g., a hard disk drive, a solid-state drive, etc.), read from memory (e.g., random access memory), or the like, as is understood by one of ordinary skill in the art. The image data may be in one or more image formats and controller 140 may execute format instructions to convert the image data into one or more other image formats. The image data 143 may include, for example, red, green, blue (RGB) values for each pixel of each image that make up the image data, as is known to those skilled in the art. A non-exhaustive list of image formats that the image data 143 may be converted from may include, but are not limited to, VP8, VP9, AV1, VP6, Sorenson Spark, H.264, H.262, MPEG-1, MPEG-2, Theora, Dirac, MPEG-4, windows media image, RealVideo, H.263, Adobe Flash Platform, and any other image format known to those of ordinary skill in the art. The image data module may use one or more image data conversion algorithms that are commercially available, open-source, or otherwise developed, according to an embodiment.

The image data module (not shown) is typically implemented as software that runs in the GPU using its array of parallel processors, and is configured to convert the format of the incoming video image data to one of three fixed packed image data formats suitable for direct transfer to the display driver. In an example embodiment, this transfer can be performed via a MIPI data link as previously described. The MIPI specification defines three data types that can be supported by the display driver.

The packed data formats include: 1) bit-plane data, 2) nibble data, and 3) byte data. Bit plane data (1) is derived by selecting one bit from the typically 8-bits for a given color and packing this selected bit from each group of 8 adjacent pixels into one 8-bit word. Once the selected bit from each pixel in the entire image is sent to the display driver 110, another bit is selected and the process repeats. Since each write of a group of the selected bits from each pixel only transfers 1-bit of information per pixel, this process must be repeated multiple times to transfer a full color image. For 8 bit RGB video, for example, which has for example, 8-bits of each red, green, and blue for each pixel the bit-plane transfer requires 24 repeats of this process. Nibble data (2) is a format in which, for example, 4 bits per pixel are sent (4 bits is a nibble by definition). These 4 bits will be either the upper 4 bits, or the lower 4 bits from each pixel. Two of these 4-bit nibbles corresponding to the selected nibble from two adjacent pixels are packed into each 8-bit word sent to the display driver 110. This process repeats until 4-bits of each pixel in the image are transferred. As only half of the color information for each pixel may be sent at a time, this process must be repeated for the other half of the color information for that color and for the other colors. Since typically 8-bit RGB video is being transferred, this nibble transfer must be repeated a total of 6 times. Byte data (3) is a format in which 8 bits (or all pixel information for a given color) are sent for each pixel in the display. Since there are three colors, this process must be repeated 3 times-once for each color.

In an example embodiment, the controller 140 may define or select one or more drive sequences 142 to apply to image data 143, at least partially based on the sensor data 102. The controller 140 may merge the one or more drive sequences 142 with image data 143 to enable dynamic reconfiguration of displayed image characteristics in the display 150. As used herein, the terms “one or more drive sequences” and “drive sequence” are used interchangeably and represent a step-by-step series of instructions sent to the display driver 110 that cause the display driver to manipulate or process the data being sent to the display in such a manner as to cause the resulting image on the display to have the desired displayed image characteristics.

Displayed image characteristics that may be altered or changed by one or more drive sequences 142 include, but are not limited to, color durations for pixels, frame-rate, color sub-frame rate, bit-depth, color sequential duty-cycle, timing, color-gamut, gamma, brightness, persistence, drive-voltages, illumination timing, and illumination intensity, and the timing of individual bit-planes sent to the display (these may determine when a liquid crystal display changes state for each gray-level, which may be adjusted according to the bit-depth and temperature), LookUp Tables (LUTs) which may determine which liquid crystal display state changes happen for each possible gray-level, and/or the serial port interface (SPI) commands (including timing and literal values for various SPI commands) that are sent to the display or other system components, which are all image characteristics understood by those of ordinary skill in the art. To define or select one or more drive sequences and to merge the one or more drive sequences with image data, the controller 140 may execute a drive sequences algorithm to generate merged image data. It should be noted that only one drive sequence will typically be used in any given video frame. However, the next frame can use a different drive sequence if more than one sequence has been sent to the display driver 110.

The drive sequences algorithm may cause the image system 100 to define or select one or more drive sequences 142, at least partially based on the sensor data. As discussed above, examples of the sensor data include, but are not limited to, inertial measurement data, ambient light data, temperature data, and eye tracking data. One or more drive sequences can be determined by mapping predetermined sensor data characteristics with predetermined display characteristics. For example, data from the eye tracking sensor may indicate that a user of the image system 100 is looking at a left visible area of the display 150. A user’s eyes looking to the left could be a predetermined sensor data characteristic that is mapped to a predetermined display characteristic, such as decrease the resolution of a right visible area of the display 150 and increase the resolution of the left visible area of the display 150. A suitable sequence which causes the display driver to format the image data corresponding to this case would be selected and used. Other predetermined sensor characteristics may be mapped to correspond with other display characteristics, so that combinations of values of sensor data from the sensors 160 results in combinations of display characteristics that formulate one or more drive sequences 142. The one or more drive sequences 142 can also be defined, at least partially, based on one or more modes or settings. An example mode or setting may include power saving mode, 3D enhancement mode, augmented reality (AR) mode, virtual reality (VR) mode, mixed reality (MR) mode, and the like.

According to one embodiment, the controller 140 formats the image data frames 141 into MIPI image frames. The MIPI image frames are modified to resemble image frames of a larger display, for example, a larger display, so that there are extra or additional “rows” of pixels that are not actually there. These extra rows may contain some header information (e.g. description of the data that follows, such as the amount and type of data or other data for the display driver device) and the drive sequence that is being updated. Upon receipt by the display driver, the parser component in the display driver strips off or removes these extra rows, extracts the drive sequence information, and applies it to the display driver logic. While MIPI image frames are one specific example implementation, other image or video formats may also be used by the controller 140. Examples of other image or video formats that may be used or modified for the concurrent transmission of one or more drive sequences and image data, include, but are not limited to, HDMI (high-definition multimedia interface), DP (display port), PCI-express, USB, Ethernet, and Wi-Fi. Each of the image data frames 141 for the merged image data may include a number of bits or bytes reserved for the one or more drive sequences 142 and a number of bits or bytes reserved for the image data 143. As each of the image data frames 141 is transmitted from the controller 140 to the display driver 110, the one or more drive sequences 142 is transmitted with the image data 143, according to an embodiment. By receiving the one or more drive sequences 142 along with the image data 143, the display driver 110 may enable dynamic reconfiguration of display characteristics by selecting one of the received drive sequences. The display driver 110 may be configured to receive the image data frames 141 and control the display 150 with the one or more drive sequences 142 included in the image data frames 141. The display driver 110 may also provide the image data 143 to the display 150, so the image data 143 may be displayed by the display 150 for user viewing. The display driver 110 may be configured to reconfigure the display 150 with display characteristics included in the one or more drive sequences 142, while providing an uninterrupted displaying of the image data 143.

Additional details regarding features of controllers, display driver devices, displays, and image data and/or sequences transmitted therebetween are further described in detail in International Application No. PCT/US2019/033809, entitled "SYSTEMS AND METHODS FOR DRIVING A DISPLAY", the entire disclosure of which is incorporated herein by reference.

Figure 2:
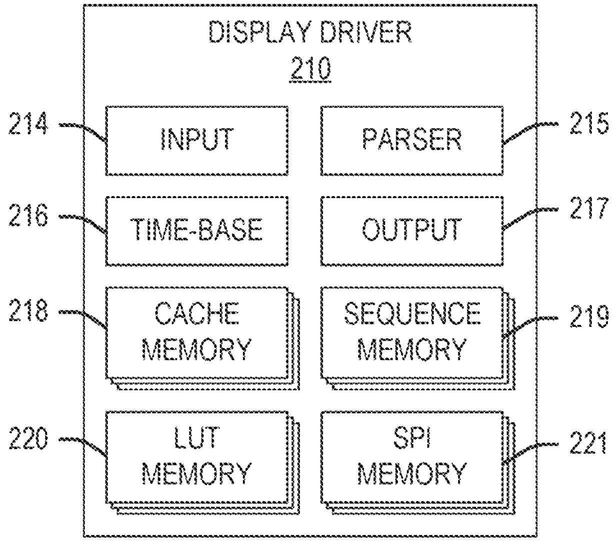
FIG. 2 is a general block diagram of a display driver, according to an example embodiment.

FIG. 2 is a block diagram of a display driver 210, according to an example embodiment. Display driver 210 is similar to display driver 110, and is illustrated here with additional components. For example, to dynamically reconfigure display characteristics within the image system, the display driver 210 includes a parser 215 and an image output 217. The parser 215 includes a parser algorithm or software module that may perform several operations within the parser 215 that may enable the display driver 210 to both process image data and the one or more drive sequences, to support dynamically updating the display without interruption to displaying image data. The parser 215 may cause the display driver 210 to receive the image data frames and to parse or separate the one or more drive sequences and the image data from the image data frames. The parser 215 may cause the display driver 210 to store the one or more drive sequences and the image data, e.g., temporarily, prior to providing the image data to the display (not shown herein). The image data can be stored in one or more cache memories 218, and the drive sequences can be stored in one or more sequence memories 219, one or more LUT memories 220, and one or more SPI memories 221. These components of display driver 210 can be integrated into a display driver integrated circuit (DDIC), provided on, for example, an application specific integrated circuit (ASIC) or similar circuitry.

The parser 215 reads header information that is added to the front of the image data that defines what, if any, sequence information is present and where it should be stored and may include instructions that are executed by display driver 210 for performing a number of operations for separating the one or more drive sequences and the image data from the image data frames. Examples of operations may include, but are not limited to, receive the data frames, search the data frames for one or more synchronization bytes that identify a portion (e.g., the first row) of a data frame, and store portions of the data frames to sequence memories or cache memories. The operations may include using the variables to perform sub-operations, such as separating the one or more drive sequences from the image data. Upon separation of the one or more drive sequences from the image data frames, the parser 215 may cause the display driver 210 to store the one or more drive sequences in one or more of memories 219-221, according to an embodiment. The one or more memories 218-221 may be volatile or nonvolatile memory or memory structures within the display driver 210. The one or more memories 218-221 may also be implemented as volatile or nonvolatile memory that is allocated for use by the display driver 210 within the image system. Upon separation of the image data from the image data frames, the parser 215 may cause the image system to store the image data in cache memory 218, or an external image data store (not shown herein).

The display driver 210 includes an image output 217 that provides the image data to the display device. The image output 217 gets data from either one or more cache memories 218 or from the LUT memories 220 as determined by the current sequence.

Time-base module 216 enables synchronization of execution of the one or more drive sequences with one or more timers, time intervals, or synchronization signals, e.g. video synchronization (VSync). In an example embodiment, VSync pulses are received via inputs 214, indicating the start of each video frame. VSync pulses may be received in the MIPI format. At each VSync pulse, a drive sequence is initialized to a first instruction in the drive sequence, and simultaneously the incoming data starts to be written to reserved locations in cache memory 218. The time-base 216 initializes to 0 at each Vsync, and counts up in increments of time hereinafter referred to as "ticks". When the timer gets to the time specified in a "Start-time" field of the first instruction, a command or operational code ("op-code") specified in that instruction is executed with arguments and flags specified in the rest of the instruction. Once execution of the operation is finished, the next instruction in the drive sequence is loaded. This continues until a final "End of Sequence" command or op-code is encountered. Generally, to enable synchronization, each instruction in a drive sequence is configured with a unique start-time, and the instructions are ordered in sequence of their start-times. Further, a configurable time period may be provided between sequence instructions, so that there is enough time between sequence instructions for the commands to be executed. Some instructions may be executed in parallel and/or asynchronously when the instructions do not require use of conflicting hardware (such as caches). All read and write operations may be associated with an entire bit-plane. These features provide individual control of the timing of each event that occurs during a frame. Where existing display drivers typically have some mechanism for controlling when data is sent to the display for example, a fixed timer, the disclosed embodiments transmit each event and specifically each bit-plane to the display at an individually configurable time. This facilitates a number of benefits, for example, the timing of individual falling edges in, for example, a PWM scheme to be set so as to achieve any desired linear or non-linear Gamma. It also allows easy modification of color-sequential algorithms to best fit the needs of a particular application.

Consequently, the operation of the display driver 210, in conjunction with other components described in FIG. 1, can enable an image system to dynamically reconfigure image display settings for a display device, without interruption to the image data being displayed by the display device. In an example embodiment, operation of display driver 210 may be enabled by one or more processors that executes each module provided therein. The one or more processors represent one or more systems on a chip (SoC), digital signal processors (DSP), graphical processing units (GPU), application-specific integrated circuits (ASIC), and/or other processors, according to various embodiments, and as is understood by those having ordinary skill in the art. The one or more processors are configured to read and execute the modules described herein from any of memories 218-221, which can include shared or independently implemented RAM, flash, other volatile memory, other non-volatile memory or memory structures, hard disk drives, and/or solid state drives, according to various implementations. In an example embodiment, the drive sequence is executed on the display driver without a processor. In other words, a combination of programmable circuits (e.g. on an ASIC or FPGA) are provided on a DDIC to execute the one or more drive sequences.

Figure 3:
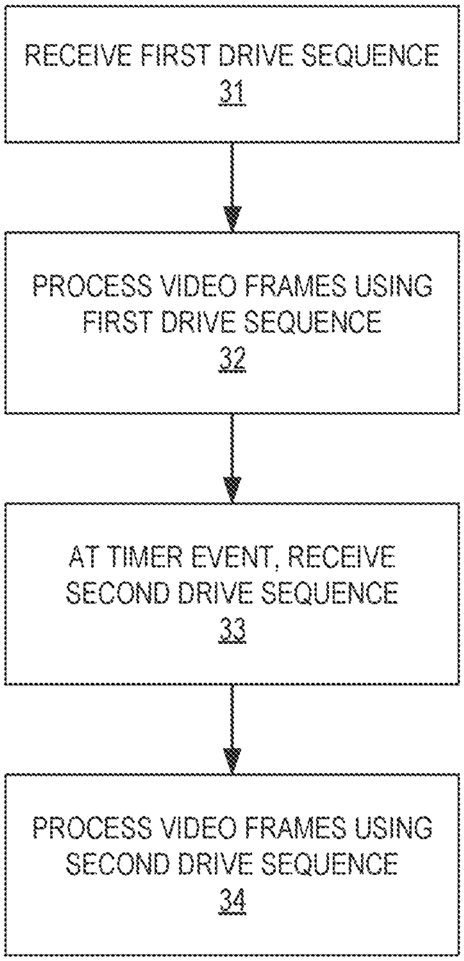
FIG. 3 is a method performed by a display driver, according to an example embodiment.

FIG. 3 is a method performed by a display driver, according to an example embodiment. For example, the method may be performed by display driver 210 illustrated in FIG. 2, or by display driver 110, illustrated in FIG. 1.

At 31, a first drive sequence is received at the display driver, and at 32, video frames are processed using the first drive sequence. As described herein, the display driver includes circuitry and/or software and other components, including a parser, and one or more memories for storing downloadable drive sequences. In an example embodiment, the first drive sequence comprises a "master sequence" that is downloaded to the display driver from an external controller, e.g. a GPU. The master sequence can include a list of instructions that specify some or all of the actions for processing the video frames, i.e. actions that the display drive circuitry takes for each frame of incoming data, for example, image and/or video data. In an example embodiment, these instructions are executed a master time-base component of the display driver, e.g. a circuit embedded on a DDIC. In an example embodiment, one of the fields in each instruction specifies what time (relative to a VSync event) each instruction of the drive sequence is to be executed. In example embodiments, instructions that may be included and executed at the specified times in the drive sequence include one or more of: writing incoming bit-plane data either to external-memory (if present) and/or to a one or more of a number of on-chip cache memories; reading bit-plane data from either external-memory (if present) and/or from one or more on-chip cache memories; combining the bit-plane data from external-memory and/or from the various caches, for example, the one or more of a number of on-chip cache memories, into a I-bit output "logic plane" using logic defined by a LUT that is also included in the sequence instruction; writing the result of this logical combination to another cache or cache(s), and/or to the output first-in-first-out (FIFO) buffer and/or memory; formatting and transmitting the contents of the output FIFO buffer and/or memory to a display device; sending SPI commands of arbitrary data and format to external display devices (including the LC or LCOS display devices) with content and at a time determined by the drive sequence; actuating other dedicated control lines that have system functions, for example, Laser Enable pins, external trigger pins, etc.;

controlling data transformations by the Output Formatter and other on-chip dedicated hardware, for example, optionally inverting the outgoing data from the output FIFO before it is transmitted to the backplane integrated circuit; and/or performing other miscellaneous on-chip tasks, for example an instruction to clear a FIFO or cache.

Further, as described herein, portions of the downloaded drive sequence may be modified or replaced with other downloadable drive sequences. Thus, at 33, a second drive sequence is received at the display driver, and at a 34, video frames processed using the second drive sequence. This second drive sequence may be downloaded responsive to a timer event, and can be triggered based on, for example, user inputs, sensor readings, system variables (such as temperature), or external instructions. For example, an external controller (e.g. GPU or host CPU) can determine that an entirely different drive sequence is required based on sensor readings or user inputs. For example, portions of the drive sequence may instruct the digital drive circuitry and/or software for example, via hardware in a DDIC, to conform to the requirements of a very wide variety of spatial light modulators, such as display devices, or to operate in a wide variety of operating modes. In an example embodiment, the second drive sequence is different from the first drive sequence in using pulse width modulation instead of duty cycle modulation for accomplishing gray-scale in the display device, or in using pseudo analog modulation instead of pulse width modulation for phase display devices. Other changes in drive sequences and portions thereof can be envisioned by those having ordinary skill in the art in light of this disclosure.

Figure 4:
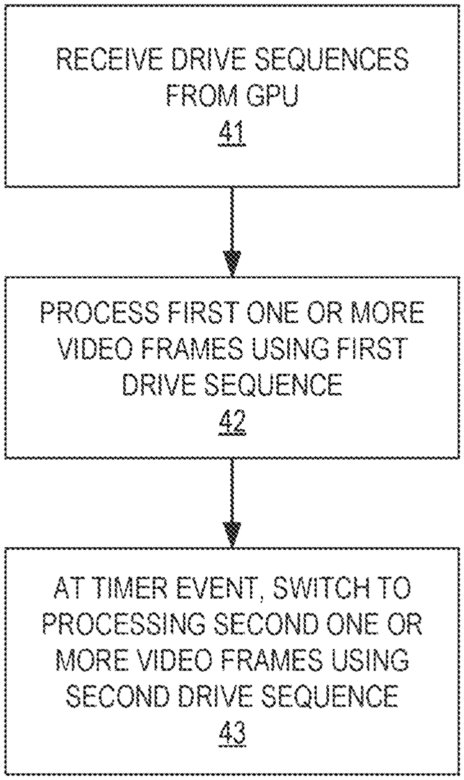
FIG. 4 is another method performed by a display driver, according to an example embodiment.

FIG. 4 is another method performed by a display driver, according to an example embodiment. For example, the method may be performed by display driver 210 illustrated in FIG. 2, or by display driver 110, illustrated in FIG. 1.

At 41, a drive sequence is received at the display driver. As described herein, the display driver includes circuitry and/or software and other components, including a parser, and one or more memories for storing downloadable drive sequences. In an example embodiment, the drive sequence comprises a "master sequence" that is downloaded to the display driver from an external controller, e.g. a GPU. The master sequence can include a list of instructions that specify some or all of the actions for processing the video frames, i.e. actions that the display drive circuitry takes for each frame of incoming data, for example, image and/or video data at step 42. In an example embodiment, these instructions are executed relative to times defined by the master time-base component of the display driver, e.g. a circuit embedded on a DDIC. In an example embodiment, one of the fields in each instruction specifies what time (relative to a VSync event) each instruction of the drive sequence is to be executed. Further, in an example embodiment, the master drive sequence can include at least a first and second drive sequence among a plurality of drive sequences, that can be invoked at different times responsive to changes in video information or external commands.

Thus, at 43, the display driver switches to utilizing a second drive sequence from the master drive sequence. This second drive sequence may be executed responsive to a timer event, and can be triggered based on, for example, user inputs, sensor readings, system variables (such as temperature), or external instructions. For example, an external controller (e.g. GPU or host CPU) can determine that an entirely different drive sequence is required based on sensor readings or user inputs. For example, portions of the drive sequence may instruct the digital drive circuitry and/or software for example, via hardware in a DDIC, to conform to the requirements of a very wide variety of spatial light modulators, such as display devices, or to operate in a wide variety of operating modes. In an example embodiment, the second drive sequence is different from the first drive sequence in using pulse width modulation instead of duty cycle modulation for accomplishing gray-scale in the display device, or in using pseudo analog modulation instead of pulse width modulation for phase display devices. Other changes in drive sequences and portions thereof can be envisioned by those having ordinary skill in the art in light of this disclosure.

Figure 5:
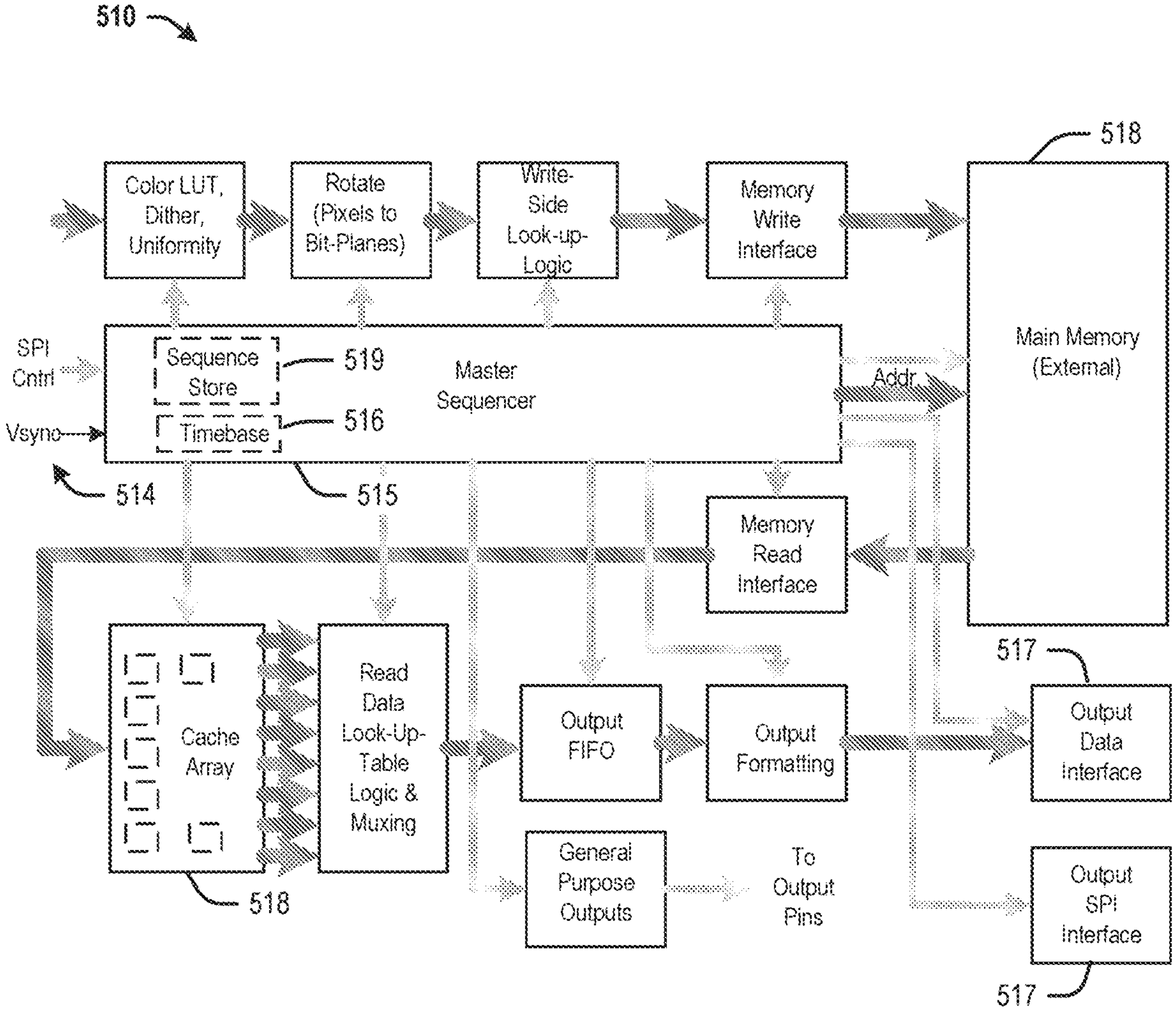
FIG. 5 is a detailed block diagram of a display driver, according to an example embodiment.

FIG. 5 is a detailed schematic of a display driver, according to an example embodiment. Display driver 510 is similar to display drivers 110 and 210, and is illustrated here with additional components. For example, to dynamically reconfigure display characteristics within the image system, the display driver 510 includes a master sequencer 515 and image outputs 51 7. The master sequencer 515 includes a parser algorithm that may perform several operations to enable the display driver 510 to both process image data and the one or more drive sequences, to support dynamically updating the display without interruption to displaying image data. The master sequencer 515 may cause the display driver 510 to receive the image data frames and to parse or separate the one or more drive sequences and the image data from the image data frames. The master sequencer 515 may cause the display driver 510 to store the one or more drive sequences and the image data, e.g., temporarily, prior to providing the image data to the display (not shown herein). The image data can be stored in one or more cache memories 518, and the drive sequences can be stored in one or more sequence memories 519. These components of display driver 510 can be integrated into a display driver integrated circuit (DDIC), provided on, for example, an application specific integrated circuit (ASIC) or similar circuitry. The master sequencer 515 may include instructions for a number of operations for separating the one or more drive sequences and the image data from the image data frames. Examples of operations may include, but are not limited to, receive the data frames, search the data frames for one or more synchronization bytes or, in some embodiments, a header data structure that identifies what image data and/or sequence data will directly follow the header and where it should be stored. The operations may include using the variables to perfonn sub-operations, such as separating the one or more drive sequences from the image data. Upon separation of the one or more drive sequences from the image data frames, the master sequencer 515 may cause the display driver 510 to store the one or more drive sequences in memory 519, and image data frames in memories 518. The memories 519, 518 may be volatile or nonvolatile memory within the display driver 510, or external to display driver 510. Upon separation of the image data from the image data frames, the master sequencer 515 may cause the image system to store the image data in cache memory 518, or an external image data store.

In an example embodiment, a drive sequence is downloaded to the sequence memory 519 via a "SPI Cntrl" input 514. Downloading of the drive sequence may occur immediately after the display driver 510 is powered-on. In an example embodiment, a drive sequence includes a list of up to 1024 128-bit words, and sequence memory 519 is structured for such a drive sequence. In other embodiments, other sizes of drive sequences and memories may be envisioned. For example, as illustrated below with respect to FIG. 7, word-widths and sequence memory arrangements differ from the present embodiment. In the present embodiment, a word width of 128-bits is used and each word has a number of dedicated fields, as is illustrated in FIG. 6.

Figure 6:
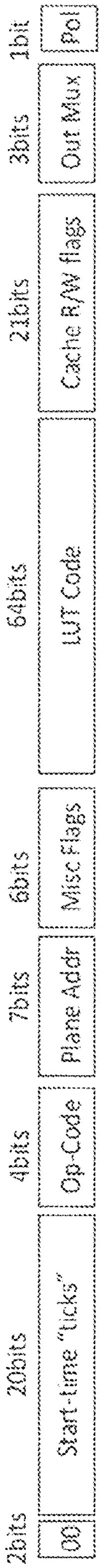
FIG. 6 is an instruction of a drive sequence, according to an example embodiment.

With reference to FIG. 6, a 128-bit instruction of an example drive sequence. In this example embodiment, the first 2-bits are not used. The field marked "Start-time "ticks"" is the time after the VSync pulse when the action specified in the instruction of the drive sequence is executed. This 20-bit number indicates "ticks", which are the internal time units in use, and can be synchronized to a system clock as well as time inputs, e.g. VSync pulses. With reference to the display driver of FIG. 5, this time can comprise 30 ns, but can be adjusted by writes to a time-base control register for other applications. The field marked "Op-Code" specifies what action is being commanded. Since this is a 4-bit field, there are 16 possible coded actions. The list of possible actions of the Op-Code may include, but are not limited to, the following actions:

- Read from main memory bit-plane <n> (where <n> is specified in the "Plane Addr" field);
- Write to Cache (Cache #specified in the "Cache R/W flags" field);
- Read from Cache (Cache #specified in the "Cache R/W flags" field);
- Combine data from 1 or more caches and optionally from main memory using logical expressions of up to 7 variables into a single output bit-stream. This is controlled via the LUT specified in the "LUT Code field";
- Write data to the Output FIFO;
- Send the contents of the Output FIFO through the "Output Formatting" and "Output Data Interface" blocks to an attached imager;
- Send arbitrary data to arbitrary addresses over the Output SPI Interface (Data and Address are specified by re-using parts of the "LUT Code" field;
- Set or clear output pins using the GPIO block;
- Other actions such as "clear FIFO", etc.;
- Control power-up, standby, or power-down modes for various internal memories or memory structures in the display driver; particularly when not used, in order to reduce power consumption;
- Enable special "full-byte" data flow-through to the display if appropriate, which can include moving entire pixel data from cache to the display, vs. single bit planes, when the display is higher bit depth;
- Configure read and write depth of the individual caches to reduce power;
- Configuring the SPI output to operate as an I2C master in some applications;
- Marking the last used Instruction.
- Turning on/off a selected illumination source at a specific time in the sequence.

The field marked "Misc Flags" are bits for multiplex (mux) control internal to the cache array, and some arithmetic control flags used with the "Read Data LUT Logic". The field marked "LUT Code" is used to create arbitrary logical functions of up to 7 different bit-plane data streams, as further described below. The field marked "Cache R/W Flags" determines which cache memories are being written-to and from what source, and which are being read-from. The field marked "Out Mux" determines whether the input to the Output FIFO comes from one of the caches, or from the LUT Logic block, or directly from the main memory. The "Pol" bit determines whether the data being sent out is inverted or not.

At each Vsync pulse (which occurs at the beginning of each video frame) the drive sequence initializes to the first instruction, and simultaneously the incoming data starts to be written to reserved locations in main memory 518, under control of one or more "write-side" registers provided in display driver 510. Time-base 516 initializes to t=0 at each VSync, and counts up in increments of "ticks". When the timer gets to the time specified in the "Start-time" field of the first drive sequence instruction referred to in FIG. 6, the Op-Code specified in that instruction is executed with the arguments and flags specified in the rest of the instruction. Once the operation is finished, the next drive sequence instruction is loaded, and the master sequencer 515 waits for the time specified in this next one. This continues until a final "End of Sequence" Op-Code is encountered. In example embodiments, each instruction in the drive sequence is configured with a unique start-time, and the instructions are ordered in sequence of their start-times. Further, a configurable time period may be provided between sequence instructions, so that there is enough time between sequence instructions for the commands to be executed. Some instructions may be executed in parallel when the instructions do not require use of conflicting hardware (such as caches). All read and write operations may be associated with an entire bit-plane. These features provide individual control of the timing of each event that occurs during a frame. Where existing display drivers typically have some mechanism for controlling when data is sent to the display for example, a fixed timer, the disclosed embodiments transmit each event and specifically each bitplane to the display at an individually selectable time. This facilitates a number of benefits, for example, the timing of individual falling edges in, for example, a PWM scheme to be set so as to achieve any desired linear or non-linear Gamma. It also allows easy modification of color sequential algorithms to best fit the needs of a particular application.

Further, the LUT logic block and the associated 64-bit field in the drive sequence enables generation of any arbitrary logical function of up to 6 variables, where these variables are understood to be bits of the pixel data word. Up to 6 inputs as a 6-bit address can be used for this 64-bit string. Since 2 to the 6th power is 64, any bit in this string of 64 can be considered to be the result of one of the possible combinations of the 6 inputs. By properly selecting the pattern of 1's and O's in this 64-bit string, the logical function may be determined. This capability enables effectively performing computations with the bit-plane data that is normally stored in the cache memories. In an example embodiment, this array may be used to generate a true output if any of the 6 inputs is true—effectively a 6-wide "OR" function is created. Alternatively or in addition, it is possible to create a function that outputs a true only if one input is true and the others are all false. These logical computations may be used as part of the process of determining when to end a pulse width modulation as a function of the particular gray-level that the bit-plane data represents. In an embodiment, the 64-bit look-up table can deal with any logical function of 6 inputs, corresponding to the 6 cache memories. In an embodiment, there are 7 caches. The 7th cache may have logic that allows the data in it to be "AND"ed or "OR"ed with the result from a previous logical operation. This provides flexibility that would normally require a 128-bit LUT. In another embodiment, the result of the 6-bit LUT function is written to the 7th cache, and in the next instruction it is combined with new data to form more extended calculations.

Other functions may be programmed into display driver 510. For example, the timebase 516 that determines the duration of a "tick" is programmable, so that faster or slower drive sequences may be executed according to user and/or device requirements. In one embodiment, the duration of the tick can be based on a length or complexity of the commands in a drive sequence. In another embodiment, the duration of a tick can be based on a fastest capable frame rate of a display device. Because the SPI output interface 517 is programmable, the SPI output interface 517 can communicate with other devices other than a display device. In an example embodiment, the SPI output interface 517 can control a SPI-programmable digital-to-analog controller (DAC), for example to set current levels for illumination LEDs or LASERs, etc. In another example embodiment, arbitrary control of output pins on the display driver 510 is provided.

Figure 7:
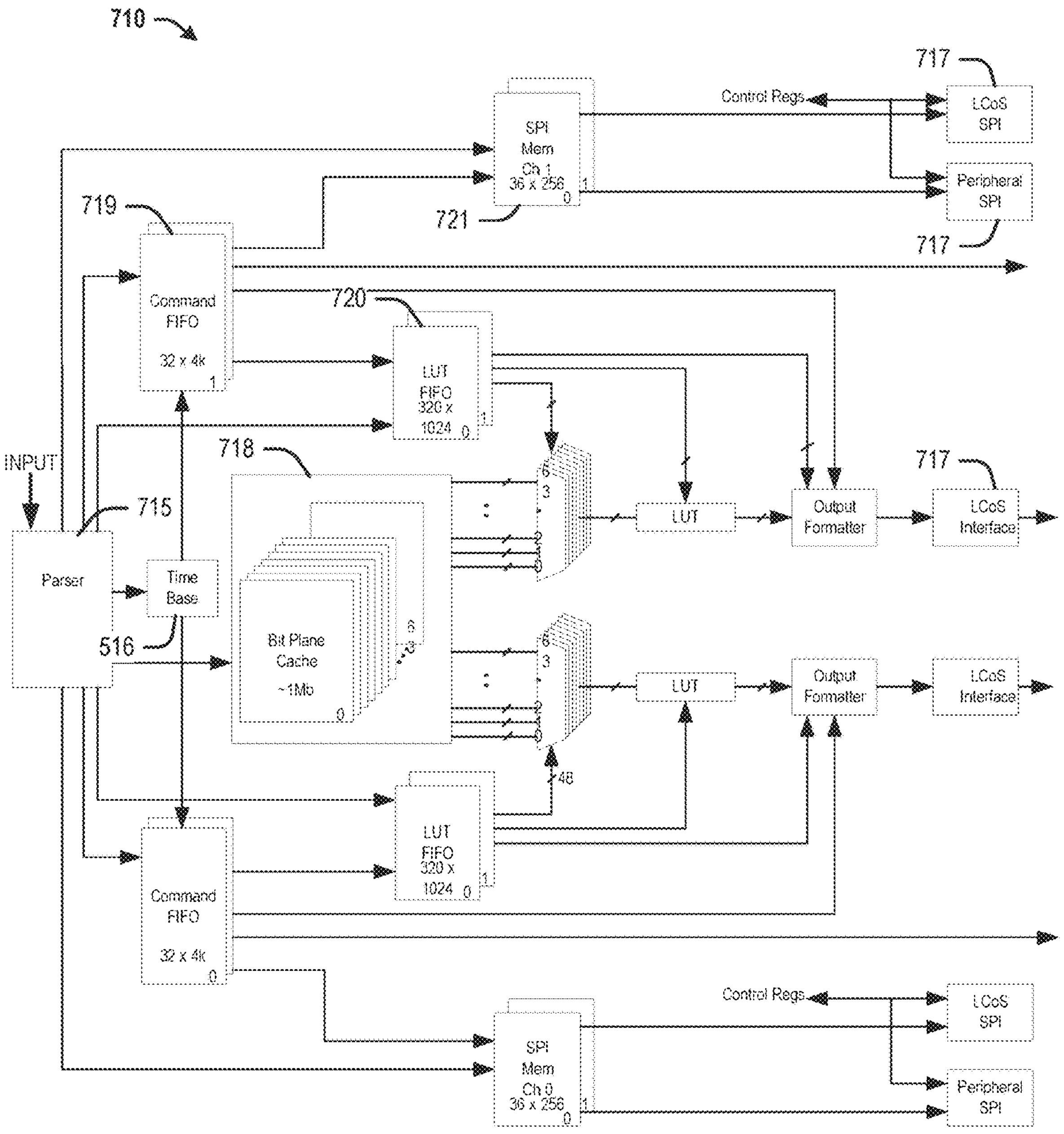
FIG. 7 is a detailed block diagram of another display driver, according to an example embodiment.

FIG. 7 is another detailed schematic of a display driver, according to an example embodiment. Display driver 710 is similar to display drivers 110 and 210, and is illustrated here with additional components. Note that in this embodiment, the "sequence" memory is separated into, for example, 3 sections, enabling, for example, updating only part of the sequence at a time. The three sections are the command FIFO 719, the LUT FIFO 720, and the SPI memory 721. For example, to dynamically reconfigure image characteristics within the image system, the parser 715 reads header information from the incoming data, determines that updated sequence information is present, and writes the results to the appropriate memories 719, 720, and 721. It would be understood by one of ordinary skill in the art that the number of sections may vary. The parser 715 includes a parser algorithm that may perform several operations within the parser 715 that may enable the display driver 710 to both process image data and the one or more drive sequences, to support dynamically updating the display without interruption to displaying image data. The parser 715 may cause the display driver 710 to receive the image data frames and to parse or separate the one or more drive sequences and the image data from the image data frames. The parser 715 may cause the display driver 710 to store the one or more drive sequences and the image data, e.g., temporarily, prior to providing the image data to the display (not shown herein). The image data can be stored in one or more cache memories 718, and the drive sequences can be stored in one or more sequence memories 719 (illustrated here as "command FIFO"), one or more LUT memories 720 (illustrated here as "LUT FIFO"), and one or more SPI memories 721. These components of display driver 710 can be integrated into a display driver integrated circuit (DDIC), provided on, for example, an application specific integrated circuit (ASIC) or similar circuitry. Further, display driver 710 is illustrated as having two channels, in that a single parser 715 and time base 716 control operation of at least two each of memories 719, 720, 721. The two channels enable high data throughput, or in some applications driving more than one display device, and channels may be added and removed depending on the specific application without departing from the scope and spirit of the disclosed embodiment.

In contrast to the display driver 510 illustrated in FIG. 5, the present embodiment illustrated in FIG. 7 eliminates the external memory and instead increases the number of cache memories 718. For example, 64 cache memories may be provided. In an example embodiment, all bit-plane data can be stored in these caches and thus the main/external memory is not needed. Further, the cache memories 718 are configured so they can be used individually, or in pairs, or in groups of 4 or 8. This allows the cache memories to fit bit-planes that would be used for differing sizes of displays, including the larger displays expected to be available as future technologies are developed. Further in contrast to the embodiment of FIGS. 5 and 6, a drive sequence can be partitioned or separated into different fields or types of instructions. In an example embodiment, a first field of a drive sequence holds only instructions, while a second field of the drive sequence holds only LUT contents, and a third field of the drive sequence holds only SPI instructions, with the separately configured memories provided on the display driver 710. Therefore, the display driver 710 can be adapted and configured to download new versions of these portions (or "subsections") of drive sequences at any point in time without interrupting the video playback output via outputs 717. Further, the various portions or subsections of a drive sequence can be increased in both depth (number of words) and width, relative to the previous embodiment of FIGS. 5 and 6. In an example embodiment, the LUT memory 720 may be 256-bits wide, such that it generates any arbitrary function of up to 8-bits. Since standard video is typically 8-bits wide, this enables calculations to be performed on the full width of incoming video in a single step. Also, individual drive sequences can be increased in depth to, for example, 4096.

Pseudo-Code

The following section describes a "pseudo-code" that represents a limited version of a drive sequence. It is to be understood that while drive sequences themselves are in binary, hex, or other machine-readable format, the following pseudo-code is presented in a human-readable format. It will be further understood by those having ordinary skill in the art that while this pseudocode section clearly does not represent a real-world drive sequence, it is intended to enable said persons having ordinary skill in the art, to program such downloadable sequences that can benefit from the novel display driver circuitry and devices/methods described herein.

Figures 8A, 8B:
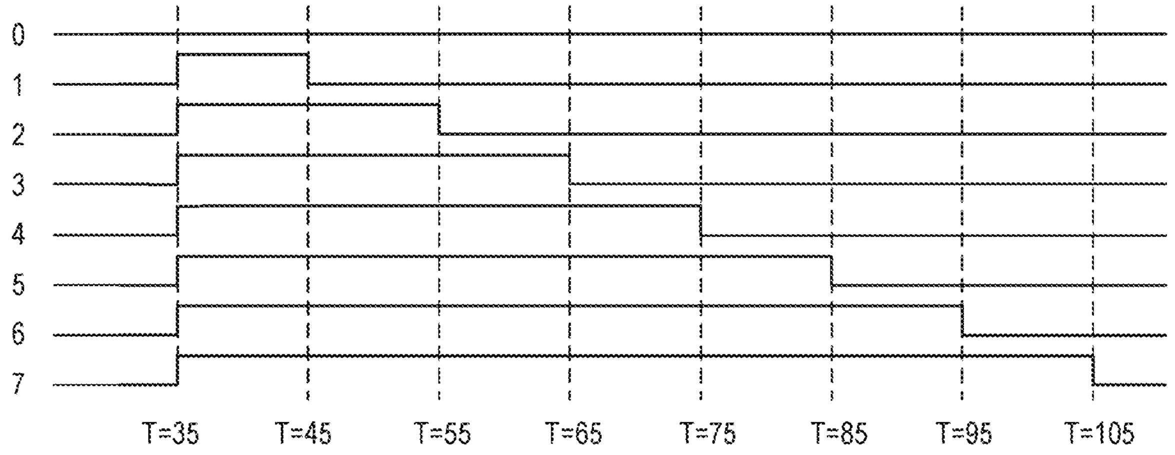
FIGS. 8A-8B depict pulse width modulation and pixel information for a pseudo-code display sequence, according to an example embodiment.

For the purposes of this section, a display driver system or device can be configured with 3 cache memories, each containing or storing 1-bit words, and accordingly limiting the LUT string to only 8 bits. Those of ordinary skill in the art will appreciate that the embodiments herein may include additional cache memories, larger Look-Up-Tables, and wider data words, such as are present in the above described L-Chip and N-Chip designs. In this embodiment, a linear PWM modulation is created, where the "on" duration of the LC is equal to the gray-value, as illustrated in FIG. 8A.

In this embodiment, the 3 cache memories will be loaded with the values 0 through 7 in the first 7 pixel addresses. FIG. 8B shows the Pixel #(which would also be the cache memory address in this embodiment), the corresponding gray-values, and the bits that would be present in Cache0 (C[0]), Cache1 (C[1]), and Cache2 (C[2]). It is to be understood that the times illustrated in FIG. 8A are illustrated and are purely arbitrary. In an embodiment, an alignment convention according to the following is assumed: when using the LUT, the C[0] value selects the LSB of the LUT address, the C[1] value selects the LSB+1 of the LUT address, and the C[2] value selects the LSB+2 (or the MSB) of the LUT address. Since the LUT is 8-bits wide, these 3 bits from the caches form a 3-bit address which can select any of these 8 bits.

At the beginning of the frame, instructions in the drive sequence to get the cache data from the main memory and load it into the three caches is provided. In pseudo-code, it can be described as follows:

At T=0: Read from main-memory or parser bit-plane 0, and write the data to C[0]

At T=10: Read from main-memory or parser bit-plane 1, and write the data to C[1]

At T=20: Read from main-memory or parser bit-plane 2, and write the data to C[2]

Next, the plane-load data for the display is calculated. In an embodiment, a two-step process is used for each plane-load. In the first step, the data is read from the 3 caches, the LUT is used to derive a 1-bit result, and these 1-bit results are written to the output FIFO. In the second step, which may start shortly after the first, the contents of the output FIFO are written to the LCOS display.

In the next instruction, a 1 is written to any pixels that have anything other than 0 as the desired gray-value. This corresponds to the rising edges provided in FIG. 5.

At T=30: Read C[0], C[1], C[2], combine using the LUT "11111110", and write to the output FIFO At T=35: Write one bit from the output FIFO to the LCOS Note the action of the LUT here. For the first pixel, the bits from "C[2], C[1], C[0]" are "000". Interpreted as an address into the LUT string, this will select the first bit at the righthand end of the LUT, which is 0. This corresponds to the top-line in FIG. 8A, which has no rising edge. Any other gray-value will result in a different address into the LUT string, which will yield a 1.

Then, subsequent or additional lines of the sequence are carried out as follows:

At T=40: Read C[0], C[1], C[2], combine using the LUT "11111100", and write to the output FIFO At T=45: Write one bit from the output FIFO to the LCOS (Note: Pixel values of "000" or "001" will have falling edges here (LUT address 000 or 001), all other pixel values will remain high)

At T=50: Read C[0], C[1], C[2], combine using the LUT "11111000", and write to the output FIFO At T=55: Write one bit from the output FIFO to the LCOS At T=60: Read C[0], C[1], C[2], combine using the LUT "11110000", and write to the output FIFO At T=65: Write one bit from the output FIFO to the LCOS At T=70: Read C[0], C[1], C[2], combine using the LUT "11100000", and write to the output FIFO At T=75: Write one bit from the output FIFO to the LCOS At T=80: Read C[0], C[1], C[2], combine using the LUT "11000000", and write to the output FIFO At T=85: Write one bit from the output FIFO to the LCOS At T=90: Read C[0], C[1], C[2], combine using the LUT "10000000", and write to the output FIFO At T=95: Write one bit from the output FIFO to the LCOS.

At T=100: Read C[0], C[1], C[2], combine using the LUT "00000000", and write to the output FIFO At T=105: Write one bit from the output FIFO to the LCOS Note that the result of the last LUT logic comparison will be 0 regardless of the cache contents because the LUT is all-0. This makes sense because a falling edge is desired at that time, if there was no previous falling edge.

For illustrative purposes, the foregoing embodiment utilizes a number of simplifying assumptions. In other embodiments, each entry in the Cache memories is an entire word corresponding to that bit-value for a number of adjacent pixels-typically 256. The LUT is applied simultaneously to each one of these pixels, and in some embodiments, each of these operations writes values for 256 pixels into and out-of the output FIFO. In addition, in other embodiments, the Sequence may have additional commands in the Sequence, including illumination control Serial Peripheral Interface (SPI) commands.

The embodiments of the present subject disclosure overcome the above-identified problems of conventional devices and methods as well as other shortcomings and deficiencies of existing technologies. The embodiments herein have several benefits and advantages, including but not limited to the following. Embodiments of the present subject disclosure place nearly all aspects of the display driving process under control of a downloadable sequence. The sequences are adapted and configured to enable designing and downloading such that there is flexibility in the configuration of features such as the gray-scale algorithm being used, the frame-rate, the bitdepth, the color order, and the timing of the illumination, etc., in contrast to known systems/methods.

The embodiments herein provide a DDIC that is maximally flexible and configurable, so that it can be used with existing display devices while retaining enough flexibility to be useable with future display chips; even those that include features that are not currently anticipated by the customer or end user. The flexible DDIC design of the embodiments herein do not require the addition of a lot of external add-on components. In addition, the embodiments do not utilize builtin hardware features that limit their applicability to only some applications.

In addition to configuration flexibility, DDIC chips/devices made according to the disclosed embodiments are extendable to future displays and display applications. The systems, methods and DDICs manufactured according to the disclosed embodiments are adapted and configured to be flexible, configurable, and customizable to meet a user's specific application requirements. As a result, the embodiments have the benefit of lowering costs, and also requiring fewer new DDIC chip designs because the embodiments herein enable wider applicability, without penalizing the simpler of these applications with additional features required for the more advanced applications.

Aspects of the subject matter described herein may be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

The subject matter described herein can be implemented in a computing system that includes a back end component (e.g., a data server), a middleware component (e.g., an application server), or a front end component (e.g., a client computer mobile device, wearable device, having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing example embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A display driver, comprising:

one or more inputs to receive image data and drive sequences from one or more external controllers;

a plurality of cache memories to store the image data;

a look-up table (LUT) memory having a bit width corresponding to a number of possible values for each pixel color component of the image data;

a parsing circuit to:

receive the image data and the drive sequences;

update the plurality of cache memories based on the received image data; and update one or more logical functions stored in the LUT memory based on the received drive sequences;

LUT logic to apply the one or more logical functions stored in the LUT memory to pixel color components of the image data to configure the image data stored in the plurality of cache memories with display characteristics, wherein the LUT logic applies each of the one or more logical functions at a respective time synchronized to a time-base that initializes at each video synchronization (VSync) signal and counts in timer increments, the respective time being specified in a command of one of the drive sequences as a number of the timer increments relative to the VSync signal; and one or more output circuits for providing the image data configured with the display characteristics to a display device via one or more output interfaces.

2. The display driver of claim 1, wherein:

each pixel color component of the image data has an image data bit width; and the bit width of the LUT memory is 2 to the power of the image data bit width.

3. The display driver of claim 2, wherein:

the image data bit width is 8 bits; and the bit width of the LUT memory is 256 bits.

4. The display driver of claim 1, wherein at least the one or more inputs, the plurality of cache memories, the LUT memory, the parsing circuit, the LUT logic, and the one or more output circuits are provided on an integrated circuit.

5. The display driver of claim 4, wherein the integrated circuit comprises an application specific integrated circuit (ASIC).

6. The display driver of claim 5, wherein the ASIC comprises a display driver integrated circuit (DDIC).

7. The display driver of claim 1, wherein the one or more external controllers comprises an image data processing circuit.

8. The display driver of claim 7, wherein the image data processing circuit comprises a graphics processing unit (GPU).

9. The display driver of claim 7, wherein an updated drive sequence is received from the image data processing circuit responsive to changes in the image data.

10. The display driver of claim 1, wherein the drive sequences each comprise at least one of the following: signal modulation characteristics, color durations for pixels, frame-rate, color sub-frame rate, bit-depth, color sequential duty-cycle, color-gamut, gamma, persistence, drive-voltages, illumination timing, illumination intensity, timing of individual bit-planes sent to the display, LookUp Tables (LUTs), or serial port interface (SPI) commands.

11. The display driver of claim 1, wherein the image data is formatted in at least one of a mobile industry processor interface (MIPI) format, a high-definition multimedia interface (HDMI) format, a display port (DP) format, a PCI-express format, a USB format, an Ethernet format, or a Wi-Fi format.

12. A method for driving a display, the method comprising:

receiving, at a display driver, image data and drive sequences from one or more external controllers;

storing the image data in a plurality of cache memories;

updating one or more logical functions stored in a look-up table (LUT) memory based on the received drive sequences, the LUT memory having a bit width corresponding to a number of possible values for each pixel color component of the image data;

applying the one or more logical functions stored in the LUT memory to pixel color components of the image data to configure the image data stored in the plurality of cache memories with display characteristics, wherein the applying is synchronized to a time-base that initializes at each video synchronization (VSync) signal and counts in timer increments, and wherein each of the one or more logical functions is applied at a respective time specified in a command of one of the drive sequences as a number of the timer increments relative to the VSync signal; and providing the image data configured with the display characteristics to a display device.

13. The method of claim 12, wherein:

each pixel color component of the image data has an image data bit width; and the bit width of the LUT memory is 2 to the power of the image data bit width.

14. The method of claim 13, wherein:

the image data bit width is 8 bits; and the bit width of the LUT memory is 256 bits.

15. The method of claim 12, wherein the image data comprises video data.

16. A display system, comprising:

a display device;

an image data processing circuit to generate image data and drive sequences; and a display driver comprising:

one or more inputs to receive the image data and drive sequences from the image data processing circuit;

a plurality of cache memories to store the image data;

a look-up table (LUT) memory having a bit width corresponding to a number of possible values for each pixel color component of the image data;

a parsing circuit to:

receive the image data and the drive sequences;

update the plurality of cache memories based on the received image data; and update one or more logical functions stored in the LUT memory based on the received drive sequences;

LUT logic to apply the one or more logical functions stored in the LUT memory to pixel color components of the image data to configure the image data stored in the plurality of cache memories with display characteristics, wherein the LUT logic applies each of the one or more logical functions at a respective time synchronized to a time-base that initializes at each video synchronization (VSync) signal and counts in timer increments, the respective time being specified in a command of one of the drive sequences as a number of the timer increments relative to the VSync signal; and one or more output circuits for providing the image data configured with the display characteristics to the display device via one or more output interfaces.

17. The display system of claim 16, wherein:

each pixel color component of the image data has an image data bit width; and the bit width of the LUT memory is 2 to the power of the image data bit width.

18. The display system of claim 17, wherein:

the image data bit width is 8 bits; and the bit width of the LUT memory is 256 bits.

19. The display system of claim 16, wherein the display driver comprises a display driver integrated circuit (DDIC).

20. The display system of claim 16, wherein the image data processing circuit comprises a graphics processing unit (GPU).

* * * * *